United States Patent [19]
Gimben et al.

[11] Patent Number: 5,454,256
[45] Date of Patent: Oct. 3, 1995

[54] POWDER COATING SYSTEM WITH DEW-POINT DETECTION

[75] Inventors: Dale N. Gimben, Grafton; Jeanne M. Leidy, Rocky River; William M. Rucki, Aurora, all of Ohio; Jeffrey Heimburger, Evansville, Ind.

[73] Assignee: Nordson Corporation, Westlake, Ohio

[21] Appl. No.: 357,982

[22] Filed: Dec. 19, 1994

Related U.S. Application Data

[60] Continuation of Ser. No. 160,472, Dec. 1, 1993, abandoned, which is a division of Ser. No. 929,289, Aug. 13, 1992, abandoned.

[51] Int. Cl.$^6$ .................................................. B05B 15/00
[52] U.S. Cl. ........................ 73/29.01; 118/663; 118/707; 427/475
[58] Field of Search ...................... 73/29.01; 118/629, 118/663–688, 707; 427/475

[56] References Cited

U.S. PATENT DOCUMENTS

| | | | |
|---|---|---|---|
| 2,316,624 | 4/1943 | Romanelli | 73/29.01 |
| 2,378,184 | 6/1945 | Carlson | 91/45 |
| 2,919,672 | 1/1960 | Benn et al. | 118/688 |
| 3,031,881 | 5/1962 | Thorson | 73/29.01 |
| 3,265,301 | 8/1966 | Amdur et al. | 73/29.01 |
| 3,336,463 | 8/1967 | Johnson | 219/366 |
| 3,450,092 | 6/1969 | Kock | 118/707 |
| 3,552,186 | 1/1971 | Sproul | 73/29.01 |
| 3,951,340 | 4/1976 | Point | 239/3 |
| 4,132,357 | 1/1979 | Blackinton | 239/11 |
| 4,174,902 | 11/1979 | Hamaguchi | 355/3 DD |
| 4,326,940 | 4/1982 | Eckles et al. | 118/688 |
| 4,357,900 | 11/1982 | Buschor | 118/681 |
| 4,367,787 | 1/1983 | Bradshaw | 118/326 |
| 4,500,560 | 2/1985 | Guffroy | 118/688 |
| 4,554,887 | 11/1985 | Yoakam et al. | 118/666 |
| 4,561,380 | 12/1985 | Mulder et al. | 118/688 |
| 4,682,874 | 7/1987 | Fantuzzo | 118/688 |
| 4,687,686 | 8/1987 | Stofleth et al. | 427/421 |
| 4,738,219 | 4/1988 | Fujisawa | 118/666 |
| 4,771,946 | 9/1988 | Moy et al. | 239/112 |
| 4,895,733 | 1/1990 | Imanidis et al. | 427/8 |
| 4,919,073 | 4/1990 | Kobayashi et al. | 118/688 |
| 5,167,714 | 12/1992 | Gimben et al. | 118/688 |

Primary Examiner—Richard E. Chilcot, Jr.
Assistant Examiner—George M. Dombroske
Attorney, Agent, or Firm—Wood, Herron & Evans

[57] ABSTRACT

A powder spray coating system has a controller configurable to a variety of different system configurations. Configuration data is keyed by an operator from menu prompts and stored for use by a microprocessor based operating program to operate the supply of powder and air to a powder spray gun. The microprocessor also presents information from monitored parameters of the system, including the supply air dew point which is monitored to provide warning signals of potential condensation in the system. Dew point detection is accomplished by measuring temperature and relative humidity and comparing the measurements with values for air at the maximum acceptable dew point. Alternatively, measurement of absolute humidity and supply air pressure are used to compute the dew point of the air which is compared with the actual temperature and maximum dew point temperature.

10 Claims, 4 Drawing Sheets

POWDER COATING SYSTEM WITH DEW-POINT DETECTION

This application is a continuation of Ser. No. 08/160,472, filed on Dec. 1, 1993 now abandoned, which is a divisional of Ser. No. 07/929,289, filed Aug. 13, 1992 now abandoned.

The present invention relates to powder coating systems and, more particularly, to powder coating system controls which are capable of being configured for use with diverse powder coating systems and which monitor dew point and humidity in the air in such systems.

BACKGROUND OF THE INVENTION

Powder coating systems are systems in which coating is deposited upon a substrate or article in the form of a powder and the deposited powder is then heated so that it will flow and harden on the surface of the substrate or article being coated. It is generally conventional in such systems to inject an electrostatically charged air-borne fluidized powder into an enclosure or booth containing the product to be coated with an electrostatic potential applied between the powder and the object to electrostatically attract the powder onto the substrate surface.

In such a system, the pressurized "shop air" from the facility is typically passed through an air dryer which reduces its dew point, initially at least, to, for example, approximately 38° F. at the shop air pressure. This partially dried supply air is then fed from the dryer through an air supply line and through various solenoid valves which are operated to control the distribution of air to various parts of the powder coating system. For example, the supply air is used to fluidize powder from a bulk powder supply, which ultimately is transported to the powder spray booth. Supply air is also used to pump the fluidized powder to a cyclone and sieve which removes air from the powder, cleans the powder and drops it into a feed hopper. Supply air is also used to pump the fluidized powder from the feed hopper to a spray gun. In addition, the control of the air-to-powder ratio supplied to the gun is achieved by air supplied through a pair of air lines as the fluidized mix is transferred out of the feed hopper.

Additionally, air is provided to a transfer pump mounted on a recycle hopper which is located at the bottom of the spray booth to transfer oversprayed powder, which does not adhere to the object being coated, out of the recycle hopper. The transfer pump transports the powder collected in the recycle hopper to the cyclone and sieve for cleaning and redeposition into the feed hopper so that it can be recycled to the spray gun.

Powder sprayed from the gun which does not adhere to the product, referred to as the oversprayed powder, is removed from the air in the powder booth and deposited into the recycle hopper by a bank of cartridge filters which are periodically pulsed by high pressure air valves controlled by a timer device. During pulsing, high pressure air is blown in the reverse direction into the cartridges to knock the powder off the outside of the cartridges which causes the powder to fall into the recycle hopper so that it can be returned to the feed hopper for reuse.

In powder coating systems, it is possible for the dew point of the supply air to rise to the point where water can condense out of the air being utilized in the system. Condensation in the various air lines of the system can cause a poor quality finish on the product and clogging of the cartridge filters.

Prior art systems have been ineffective in preventing such condensation or in providing adequate advance detection of the conditions under which such condensation is likely to occur. Consequently, there is a need for a system for detecting the occurrence of condensation in a powder coating system or the conditions under which condensation is likely to result.

Furthermore, control of the powder coating systems has been traditionally carried out through the use of various separate control devices having digital and analog inputs and outputs which connect with various valves, servos, sensors and switches of the system to control, in a semi-automatic manner, the operation of the system. This prior art practice requires custom engineering and special configuration of each control system to conform to the characteristics of the particular system, and accordingly, design of the controls for such systems have been necessarily specific to the systems in which they are employed. Consequently, the use of sophisticated controllers has been confined principally to the larger scale systems.

Therefore, there is also a need to provide flexible controllers for use in diverse powder coating systems which do not require custom design.

SUMMARY OF THE INVENTION

It is therefore an objective of the present invention to provide a system for monitoring and/or controlling powder coating systems which is adaptable to systems of various arrangements and designs.

It is a further objective of the present invention to provide a powder coating system and a control for use with powder coating systems which will monitor the humidity or dew point of the system supply air and respond to certain monitored conditions with an alarm or with corrective action.

In accordance with principles of the present invention, there is provided a powder coating system controller which includes a microprocessor for controlling the operation of powder coating systems of various configurations, and which is capable of implementing a plurality of program options. The controller includes an entry device such as a keyboard for selecting from among various program options to operate the various system configurations.

By providing a controller which can be configured to suit a variety of systems, a controller is provided which renders practical the option of providing for small and medium scale powder coating systems a sophisticated controller heretofore only practical in a complex and expensive system.

In accordance with other principles of the present invention, there is provided a powder coating system in which parameters of the system supply air are monitored for computation of its dew point and action is taken in response to the monitored parameters to warn of condensation conditions within the powder coating system so that corrective action can be taken such as repair or replacement of air dryers, or shutdown of the system, before condensation occurs.

In accordance with one preferred embodiment of the present invention, the temperature and relative humidity of the air entering the system are monitored and a computation is made from the monitored value of temperature to determine the relative humidity of the air required to produce a dew point equal to the preset limit of, say, 50° F. Then the computed humidity for 50° F. dew point air is compared with the measured relative humidity of the incoming air. If the actual humidity exceeds that for the 50° F. air, a signal is generated to initiate an alarm or corrective action.

In accordance with an alternative preferred embodiment of the present invention, the temperature, absolute humidity and pressure of the incoming air are monitored and the actual dew point of the air entering the system is computed. Then the computed dew point is compared with the measured temperature and with a preset maximum dew point temperature and the information is either displayed to the operator, and, or in the alternative, an alarm is activated or corrective action initiated such as air dryer replacement or repair, or system shutdown, if the dew point is higher than either the actual temperature or the preset limit.

By providing a powder coating system with the ability to sense and signal conditions whereby the dew point of the supply air is too high to safely avoid condensation of water in the system, an advantage heretofore unavailable in the prior art is provided which solves the critical problems set forth above of filter clogging and coating imperfections caused by condensation.

DESCRIPTION OF THE DRAWINGS

The above and other objectives and advantages of the present invention will be more readily apparent from the following detailed description of the drawings in which:

Referring to FIG. 1, a powder coating system 10 according to a preferred embodiment of the present invention is illustrated. The system 10 includes a powder spray booth 11 in which a manufactured part or other product 12 which forms a substrate or article to be coated is supported on a conveyor. While in the booth 11, a coating is deposited upon the product 12 in the form of a powder which is then heated to cause it to flow and harden on the substrate surface.

The powder is sprayed into the booth from an electrostatic spray gun 14 which electrostatically charges the powder so that it is electrostatically attracted to the surface of product to be coated, which is maintained at ground potential in the illustrated embodiment. The gun is operated under the control and power of a master control and power unit console 15 which is connected to the gun 14 through an electrostatic cable 16.

Figure 1:
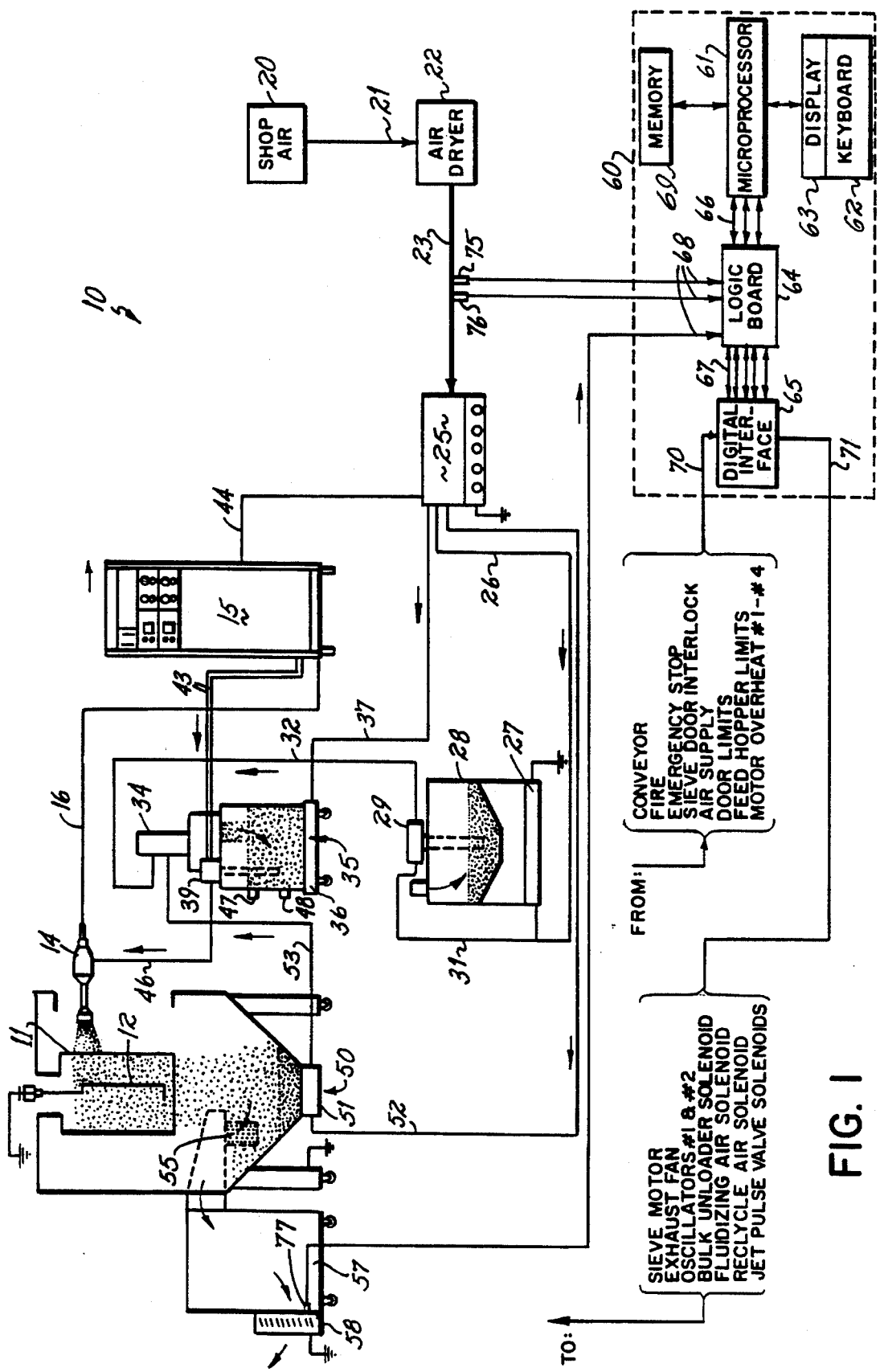
FIG. 1 is a schematic diagram of a powder coating system controlled in accordance with principles of the present invention.

The air which fluidizes the powder sprayed from the gun 14 is the ambient air or "shop air" from the facility as represented by the block 20 in FIG. 1. This shop air is a pressurized air supply and is supplied through a line 21 to an air dryer 22 where it is dehumidified and exhausted with a dew point of approximately 38° F., at shop air pressure, through a dryer outlet duct 23 which is connected to an air distribution and flow control panel 25. Air is distributed from the control panel 25 through a plurality of solenoid valves (not shown) to various components of the powder coating system.

From the air control panel 25, air is provided through a conduit 26 to a fluidizing plenum 27 at the base of a bulk powder unloader 28. A bulk unloader such as the type shown in U.S. Pat. No. 4,505,623 could also be used. The powder is fluidized in unloader 28 so that it can be pumped into the system 10 by a transfer pump 29 which is also supplied with air from the control panel 25 through an air line 31 connected between the pump 29 and the line 26. Alternatively, a separate air line could be provided between panel 25 and pump 29. The fluidized powder is transferred by the transfer pump 29 through an air line 32 connected from the outlet of the pump 29 to a cyclone and sieve unit 34 on the top of a feed hopper 35. The unit 34, separates air from the powder, cleans the transferred fluidized powder and drops it into the feed hopper 35.

The feed hopper 35 also has an air plenum 36 in its base to which air is directly supplied through an air line 37 from the panel 25 so that the powder dropped into it is maintained in fluidized state for pumping to a powder spray gun 14. A powder pump 39 is supported on the top of the feed hopper 35 and has air inlets connected to feed lines 43 from the master control and power unit 15 to which supply air is provided through air line 44 from the air control panel 25. The pump 39 operates to transfer powder out of the feed hopper 35 and varies the air-to-powder ratio in the powder-air mixture supplied to the spray gun 14 through a pump outlet line 46 from the pump 39.

Feed hopper 35 also includes level sensors 47 and 48. These level sensors are, in the preferred embodiment, Model LSM 1700 Series Vibratol® Level Sensors available from Endress Hauser, Inc. of Greenwood, Ind. Sensor 47 is a high level sensor which generates a digital signal to indicate that the hopper 35 is filled. Sensor 48 is a low level sensor which generates a digital signal to indicate that the level of the feed hopper 35 is low requiring the addition of powder.

A recycle hopper 50 is also provided in the system 10 at the bottom of the spray booth 11 to reclaim and recycle oversprayed powder from the booth 11. The hopper 50 is provided with a transfer pump 51 located in its base and having an air inlet connected through line 52 to the air control panel 25. The powder in the recycle hopper 50 may also be fluidized prior to transfer through pump 51 by means of a fluidizing plate and air plenum (not shown) located at the bottom of the hopper 50. The transfer pump 51 has an outlet connected through line 53 to an inlet of the cyclone and sieve unit 34 on the hopper 35 to transfer oversprayed powder, which does not adhere to the product 12 being coated, back into the system 10 for recycling. At the cyclone and sieve 34, the recycled powder is separated from the air, cleaned, and redeposited into the feed hopper 35 from which it is fed again to the gun 14 with the fresh powder from line 32.

Removal from the air of the oversprayed powder at the powder booth 11 is achieved by exhausting the air through a bank of cartridge filters 55. An exhaust fan assembly 57 draws the air from the booth 11 through the filters 55, blowing it through a final filter 58 to exhaust back to the atmosphere. The filters 55 are periodically pulsed with high pressure air jets in reverse direction to knock the powder off the outside of the filters 55 from which it can fall into the recycle hopper 50.

Control of the system 10 is provided by a microprocessor based controller 60 which includes a microprocessor 61, to which are connected a keyboard 62 and a display or monitor 63, a logic board 64 and a digital interface 65. The logic board 64 has a digital data cable 66 connecting it with the microprocessor 61, another digital cable 67 connecting it with the digital interface 65, and a set of analog input cable ports 68 connected from transducers (later described) of the system 10. The interface has a set of digital inputs 70 connected to various switches and digital output devices of the system 10 and a set of digital outputs 71 connected to various switches, solenoids and relays of the system 10.

Analog inputs to the logic board 64 are provided by two transducers, a temperature sensor 75 and a relative humidity sensor 76. Both sensors 75,76 are located in the supply air line 23 to measure the temperature and relative humidity respectively of the air from the dryer 22 to the air control panel 25 from which it is distributed to the system 10. A third analog input of the logic board 64 is connected to a Model No. 264 Very Low Differential Pressure Transducer 77 available from Setra Systems, Inc. of Acton, Mass. The transducer 77 is positioned at the inlet of the final filter 58 in the exhaust fan assembly 57. If the pressure in the assembly is too low, the condition indicates that either the final filter has been removed or the fan is not operating properly. If the pressure is too high, then the condition indicates that the cartridge filters 55 are leaking, or that fine particles are passing through the cartridge filters 55, causing the final filter to clog. Each of the transducers 75, 76 and 77 produces an analog signal output which is transmitted to the logic board 64 by way of the analog inputs 68. The logic board 64 includes an analog to digital converter which converts the temperature, relative humidity and final filter pressure analog signals to digital signals for processing by the microprocessor 61. A non-volatile storage medium or memory (NVRAM) 69 is included in the controller 60 and connected to the microprocessor 61 for storing configuration data to be used by the program and controls.

The digital inputs 70 of the digital interface 65 include such digital sensors of the system 10 that it is desirable to provide or that may be provided in the system to monitor the condition of various of its functions. These include, for example, a conveyor status switch, a fire status switch, an emergency stop sensor, a sieve door interlock switch, an air supply on switch, a fan assembly presence detector limit switch, feed hopper high and low level limit switches and motor over load switches. Similarly, the digital outputs 71 are such signal lines as may be necessary to control the relays, solenoids, motors and other digital functions of the system 10. These include a sieve motor on/off control, an exhaust fan on/off control, a pair of oscillator on/off controls, a bulk unloader solenoid, a fluidizing air solenoid, and a recycle air solenoid, and a jet pulse valve solenoid for each cartridge filter 55. Each digital output energizes one of the motors or solenoids of the system 10 as described above.

Figure 2A:
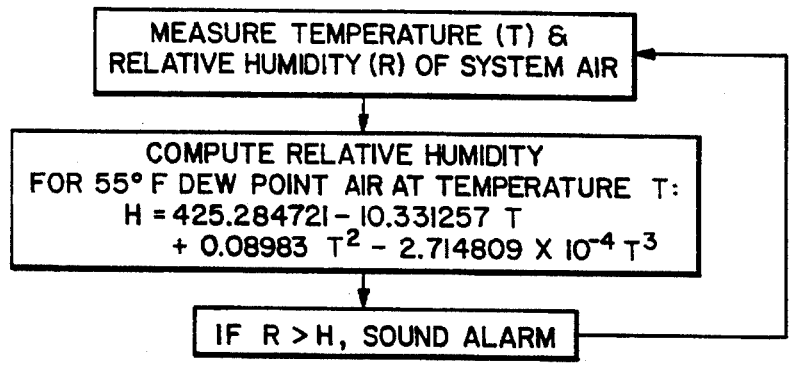
FIGS. 2A, 2B are a flow-charts of the dew point monitoring feature of the system of FIG. 1 in accordance with alternative preferred embodiments of the present invention.

FIG. 2A is a flowchart of the program loop which implements one preferred embodiment of the dew point monitoring feature. In accordance with this embodiment, the controller periodically reads the intake air temperature T and the intake air relative humidity R from the dryer. These values are sensed in the form of analog signals input from the sensors 75,76 to the logic board 64 and there converted to digital signals which are communicated to the microprocessor 61. From the temperature reading T, the microprocessor program computes the corresponding value of relative humidity H for air at the temperature T if the dew point of the air were at the preset limit S which, for example, is set at 50° F. The computed relative humidity H for 50° F. dew point air is computed by numeric approximation according to the formula:

$$H = .284721 - 10.331257\ T + .08983\ T^2 - 2.714809 \times 10^{-4}\ T^3$$

The monitored relative humidity R is then compared with the computed relative humidity H and, if greater, an alarm is sounded indicating that the dew point of the air must be greater than the preset 50° F. dew point temperature S.

Figure 2B:
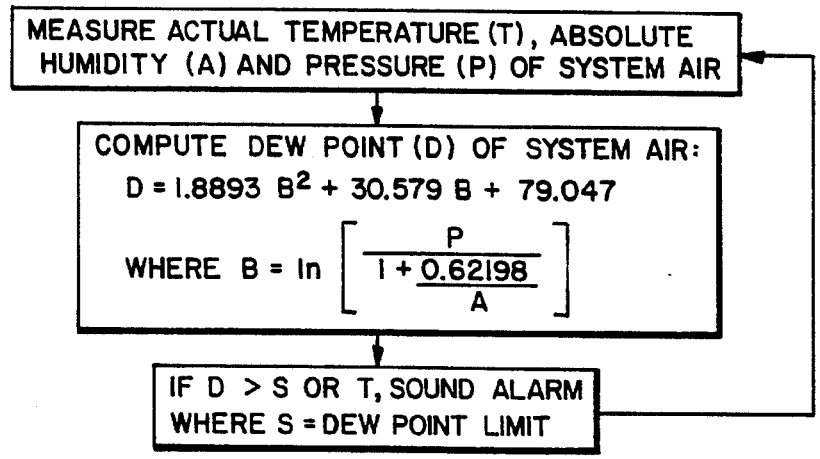

In accordance with the alternative preferred embodiment of the dew point monitoring feature of the present invention represented by the flowchart of FIG. 2B, the absolute humidity A of the intake air is measured along with the air pressure P. From these values, the program computes directly the dew point temperature D of the supply air according to the formula:

$$D = .8893\ B^2 + 30.579\ B + .047$$

where $$B = ln[P/(1 + 0.62198/A)]$$

This computed dew point D is then displayed directly along with the maximum acceptable dew point temperature setting S and the actual measured air temperature T. It is also compared with both values and, if the dew point D exceeds either the setting S or the actual temperature T, an alarm is triggered.

Figure 3:
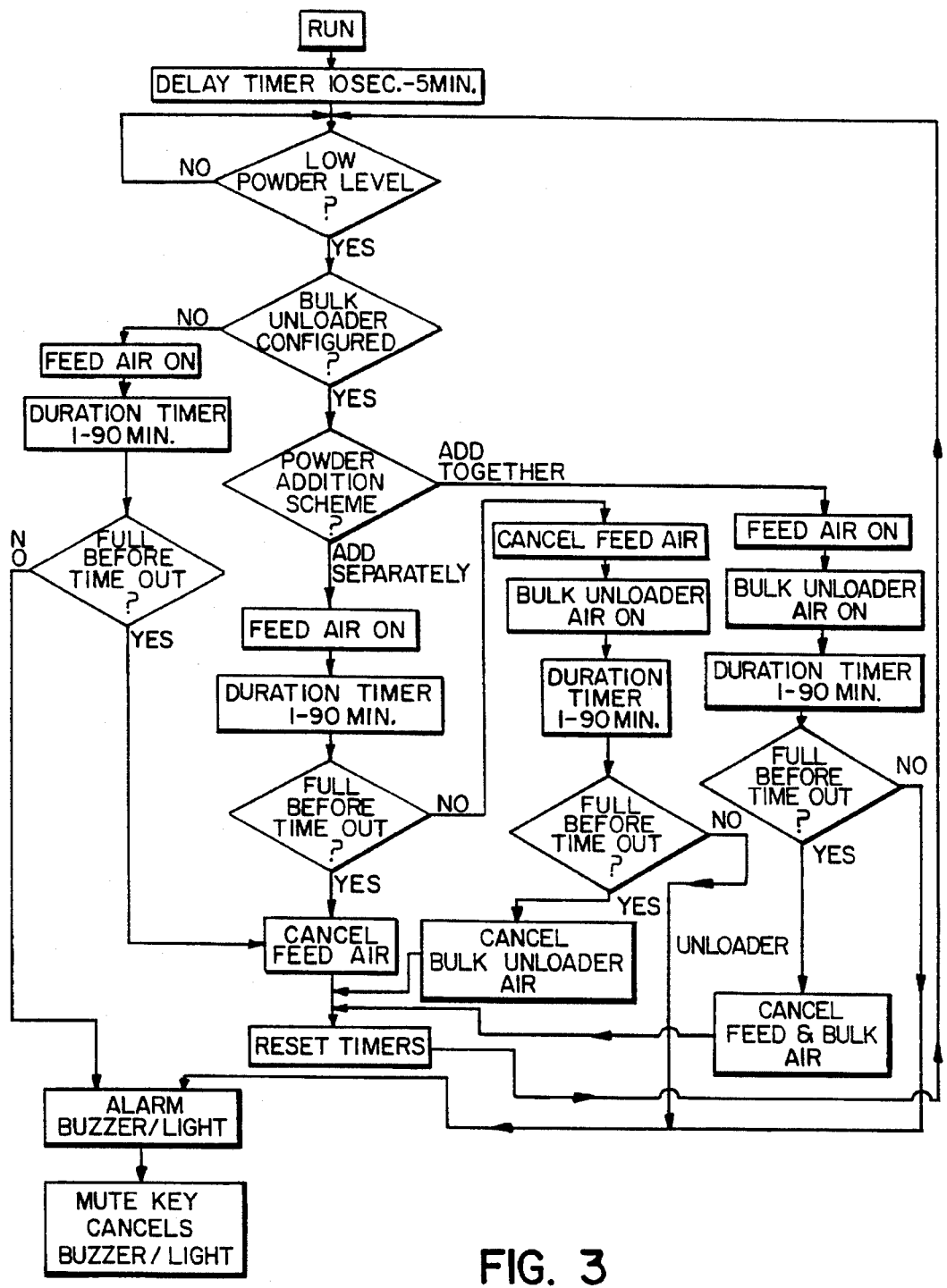
FIG. 3 is a flow chart illustrating one of the programmed operations of the system of FIG. 1.

The flowchart of FIG. 3 illustrates the operation of one configuration of a powder addition portion of a powder coating system of FIG. 1. Generally, there are three common types of powder addition schemes which are used to maintain the level of powder in the feed hopper 35 (FIG. 1): systems with no bulk unloader, systems with a bulk unloader from which new powder is added along with recycled powder, and systems with a bulk unloader in which new powder is added only when no oversprayed powder is available to recycle. In addition, various other operating parameters, such as time delays, may differ for systems of different configurations.

As the flowchart of FIG. 3 illustrates, and referring to the elements of FIG. 1, as the system 10 runs, a time delay interval is awaited and then a sensor in the powder feed hopper 35 is sensed. If the powder level in the hopper 35 is not low, the program loops until it receives a signal that additional powder is needed. When additional powder is required, configuration data stored in non-volatile memory 69 is interrogated to determine whether the system 10 includes a bulk unloader 28.

If no bulk unloader is specified in the configuration data stored in memory 69, a feed air solenoid is activated to turn on the feed air for a maximum time interval set by a duration timer. This timer sets a maximum interval during which the operator is expected to add powder. If the operator fails to add powder within the time interval required, an alarm will sound and will remain sounding until manually cancelled. If the hopper 35 is filled during the required interval as sensed by a sensor 47 in the feed hopper 35, the feed air is turned off, all timers are reset and the system returns to await another signal calling for the addition of further powder to the hopper 35.

If a bulk unloader 28 is specified in the configuration data in the memory 69, then the data is further checked to determine whether the system is configured so that new and recycled powder should be added together or separately. If the configuration data in memory 69 specifies that the new and recycled powders are to be added together, then the feed air is turned on, the bulk unloader air on line 26 is turned on and level sensor 47 in the feed hopper 35 is monitored to determine whether the hopper is filled within the interval set by a duration timer. If so, the air supplies are turned off, the timers reset and control returns to await a further demand for powder by the hopper. If the time interval lapses without the hopper being filled, an alarm is sounded for operator attention.

If the configuration data from memory 69 indicates that the system is configured for separate or sequential adding of recycled and new powder, then feed air is turned on, a duration timer started and, if the hopper fills with recycled powder before the timer expires, the feed air is turned off and no feeding of new powder will take place. Thereupon, the timers will be reset and control will return to await a further demand for powder by the hopper 35. If the interval timer expires before the hopper is filled (indicating that there was insufficient recycled powder available in the recycle hopper 50) then the bulk unloader air is turned on, a duration timer is set, and if the hopper fills during the interval set by the timer, the bulk unloader air is turned off, the timers are reset and the control returns to await a further signal for powder by the hopper 35. If the interval expires before the hopper is filled (indicating that there is insufficient powder in the unloader to fill the hopper), the alarm is sounded to alert the operator.

The flowchart of FIG. 3 illustrates only one portion of a powder coating system control operation which is subject to change in accordance with the configuration of the system. The configuring of the controller to accommodate various system configurations is set forth in the description of the menu tree of FIG. 4 below. From the description of this example and the description of the menu diagram of FIG. 4 below, one skilled in the art will appreciate how the system configuration data relates to other aspects of the control of various powder coating systems.

Figure 5:
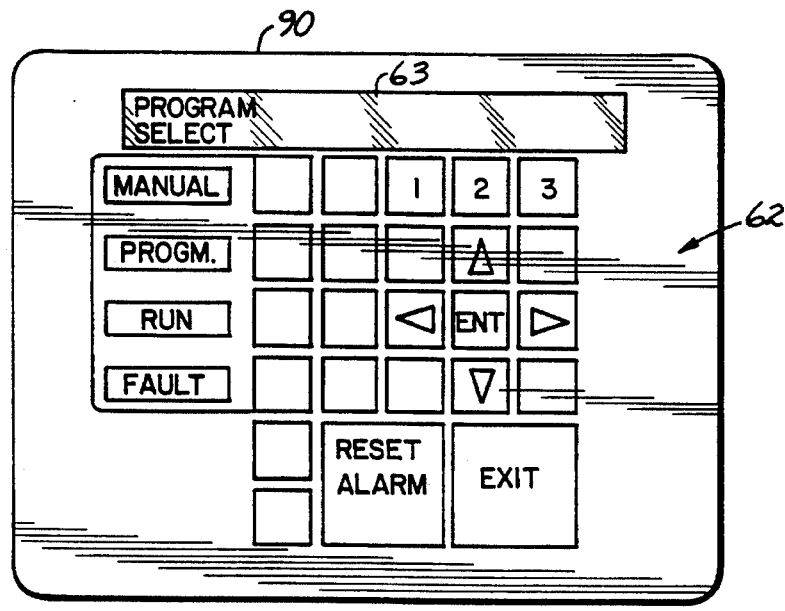
FIG. 5 is a drawing of a control panel of the system of FIG. 1.
Figure 4:
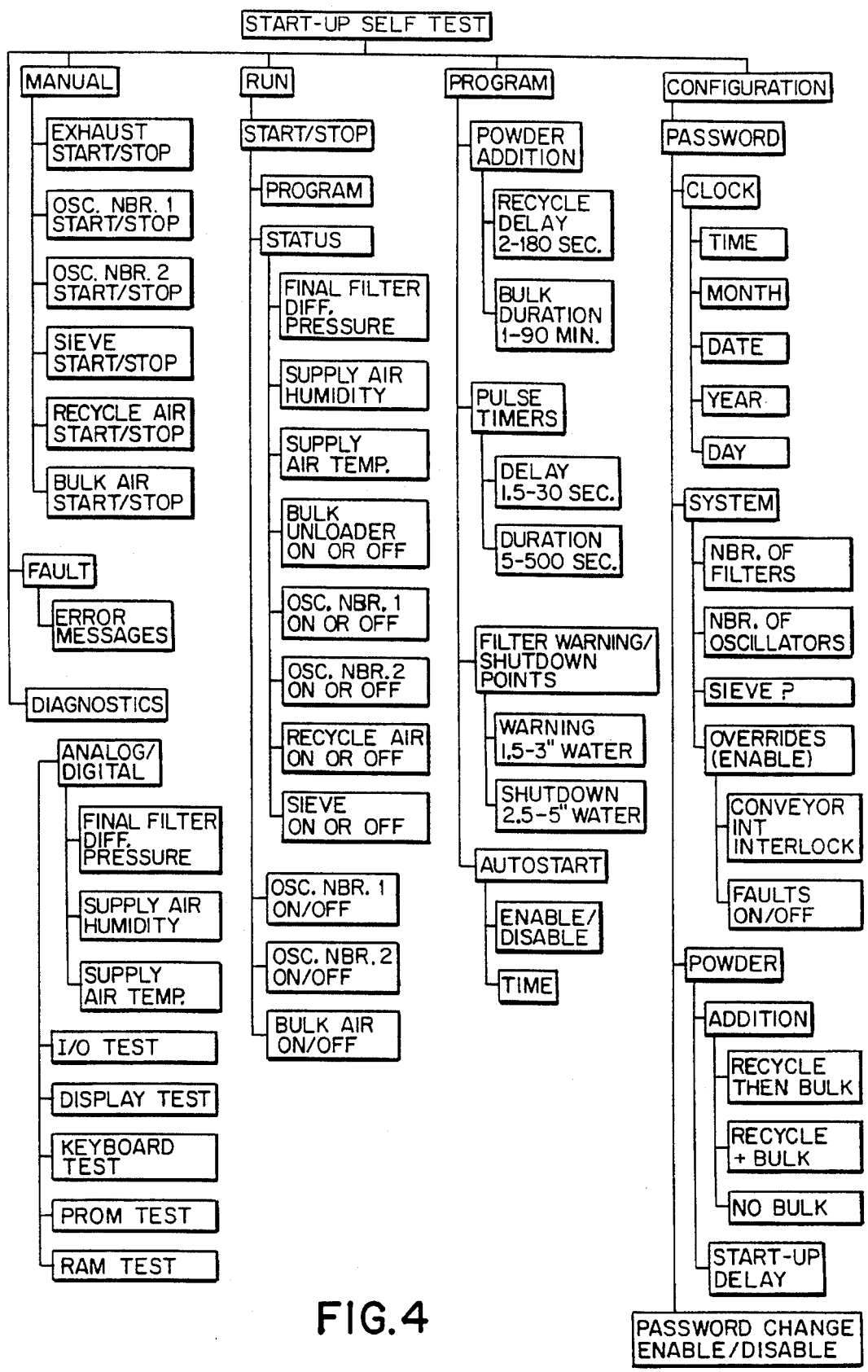
FIG. 4 is a block diagram illustrating the menu selectable functions of the system of FIG. 1.

The menu tree and flowchart of FIG. 4 shows the options which may be set, and the information entered, by the operator at the keyboard 62 (FIGS. 1 and 5). As FIG. 4 shows, upon start-up, a self test is performed of the controller hardware and a prompt is displayed on the display 63 (FIG. 1) requesting entry of an option by the operator, as will be more readily understood by reference to the drawing of FIG. 5 illustrating a panel 90 which contains the display 63 and the keyboard 62. Referring to FIG. 5, four function keys are provided, one for selection of each of four modes: MANUAL, PROGRAM, RUN and FAULT. In addition, two other modes are selectable by pressing two keys simultaneously. These are the DIAGNOSTICS mode, selected by pressing the MANUAL and PROGRAM keys together, and the CONFIGURATION mode selected by pressing the PROGRAM and RUN keys together.

Selection of any of the six modes causes the display of the menu options represented by the boxes indented to the first level in the chart of FIG. 4. For example, in the CONFIGURATION mode, four options, CLOCK, SYSTEM, POWDER and PASSWORD are displayed. In the configuration mode, however, before the menu options are displayed, a password must be entered as indicated by the box beneath the CONFIGURATION box on the chart of FIG. 4. The password is entered as a number on the numeric keys on the keyboard 62 of FIG. 5. The prompts for the menu will be displayed on the display 63 of the panel shown in FIG. 5. Selection of the menu options is made by curser movement only which causes a curser to move among and highlight menu entries on the display, and then by selection of the highlighted entry by pressing the ENTRY key on the panel 90.

To set the parameters of the powder addition operation depicted in the flowchart of FIG. 3, the POWDER option is selected on the CONFIGURATION menu. The selection of the POWDER option causes the menu to display options for selecting the powder ADDITION configuration and for setting the START-UP delay. When the ADDITION option is selected, three options are displayed on the display 63, the RECYCLE-THEN-BULK option, the RECYCLE+BULK option and the NO BULK option, any one of which may be selected. When selected, the configuration data representing the selection is stored in the memory 69 for use by the program when the operation is run. The ADDITION options are as explained in connection with the description of the flowchart of FIG. 3 above. When the START-UP DELAY option is selected, the current setting is displayed numerically on the display 63 and the cursor movement keys are used to increase (the UP arrows) or decrease (the DOWN arrows) the value from that set.

Other options may be set in the CONFIGURATION mode. For example, under the SYSTEM configuration option, the NUMBER OF FILTERS option displays a default setting of, for example, 20 filters to be increased or decreased by the use of the arrow keys. The setting of the number of filters, together with the delay and duration timer settings, determines the duty cycle of the reverse jet pulsing valves. The system includes checks to insure that the system is not programmed to produce a duty cycle in excess of the maximum recommended duty cycle for the valves. Similarly, the NUMBER OF OSCILLATORS of the spray gun must be specified in the CONFIGURATION mode. The oscillators are reciprocating gun holders located in the spray booth. Also, whether or not a sieve is provided in the system may be specified by selecting the SIEVE option. In the OVERRIDE portion of the program, minor non-required fault shutdowns may also be disabled. Such configurations are stored as data in the memory 69.

In addition to the CONFIGURATION modes, selections may be made on the panel of FIG. 5 from the menus described under the other mode selections shown in FIG. 4. For example, in the MANUAL mode, independent control of EXHAUST START/STOP, OSCILLATOR #1 START/STOP, OSCILLATOR #2 START/STOP, SIEVE START/STOP, RECYCLE AIR START/STOP and BULK AIR START/STOP may be made by utilizing the keyboard in conjunction with the display as described above. This is useful when trouble shooting system problems.

Similarly, various changes in program parameters, for example, the various timers, may be made by selecting the menu options illustrated in FIG. 4 under PROGRAM mode. Under the RUN mode, program START/STOP may be selected to run the system under the program and the OSCILLATOR #1 ON/OFF, OSCILLATOR #2 ON/OFF and BULK AIR ON/OFF may be separately activated or turned off. Under the RUN mode, a PROGRAM option may be selected to change program options (those illustrated under the PROGRAM mode in FIG. 4) while the system is running. In addition, while in the RUN mode, a STATUS option may be selected to display the status of FINAL FILTER DIFFERENTIAL PRESSURE, SUPPLY AIR RELATIVE HUMIDITY, SUPPLY AIR TEMPERATURE, BULK UNLOADER ON OR OFF status, OSCILLATOR #1 ON OR OFF status, RECYCLE AIR ON OR OFF status, and SIEVE ON OR OFF status. For the embodiment of the dew point monitoring option of FIG. 2B above, options for display of ABSOLUTE HUMIDITY, DEW POINT TEMPERATURE, ACTUAL TEMPERATURE and other parameters may also be provided.

In the DIAGNOSTICS mode, various tests may be selected as illustrated under that mode in FIG. 4. Error messages may be displayed in the FAULT mode.

In view of the foregoing description, it can be appreciated that the system of this invention provides powder coating system users of systems of numerous variations with a single control package which can control all such systems through programming of the control on site. Heretofore, as explained above, control of such systems has only been achieved through separate and diversely located control devices throughout the system which were configured to each particular system. Moreover the user, by means of this invention, is now provided with means for detecting condensation or the approach of condensation within the system to permit repair or replacement of air dryers, or system shutdown before condensation occurs.

While various embodiments and features of the invention have been described, those skilled in the art will recognize that variations and additions to those features and functions can be made within the scope of the invention. The invention is therefore intended to be limited only by the scope of the appended claims.

I claim:

1. A method of controlling powder handling conditions in a powder coating system, the method comprising the steps of:

providing a powder coating device operable to dispense fluidized powder coating material;

supplying air from a pressurized source to the system for fluidizing powder therein and feeding the fluidized powder to the coating device;

monitoring humidity of air from the source being supplied to the system;

processing information obtained in the humidity monitoring step to determine the approximate dew point temperature of the air being supplied to the system; and generating, in response to the processing step, a dew point signal containing information of the determined approximate dew point temperature;

comparing the information contained in the dew point signal to a preset dew point temperature limit;

generating an output comparison signal in response to said comparison; and controlling powder handling conditions of the system to prevent condensation of moisture from the air therein.

2. The method of claim 1 wherein:

the monitoring step also comprises monitoring the temperature of air being supplied to said system, and the processing step also comprises processing temperature and humidity information obtained in said monitoring step to determine the approximate dew point temperature of air in said system.

3. The method of claim 2 wherein:

the controlling step comprises displaying the monitored temperature.

4. The method of claim 1 wherein:

the controlling step comprises activating an alarm in response to the output comparison signal if the approximate dew point temperature exceeds the preset dew point temperature limit, 5. The method of claim 1 wherein: p1 the controlling step comprises drying the air being supplied to the system in response to the output comparison signal if the approximate dew point temperature exceeds the preset dew point temperature limit.

6. The method of claim 1 wherein:

the controlling step comprises shutting down the powder coating system in response to the output comparison signal if the approximate dew point temperature exceeds the preset dew point temperature limit.

7. The method of claim 1 amended:

the controlling step comprises displaying the preset dew point temperature, the approximate dew point temperature, and the humidity of air in the system for comparison by the operator.

8. The method of claim 1 wherein:

the controlling step comprises displaying the approximate dew point temperature.

9. The method of claim 1 wherein:

the controlling step comprises displaying the humidity of the air being supplied to the system.

10. The method of claim 1 wherein:

the controlling step comprises displaying the humidity of the air being supplied to the system.

* * * * *